J. C. FYFE.
TILTING TOP TRIPOD.
APPLICATION FILED MAY 23, 1908.

931,692.

Patented Aug. 17, 1909.

Witnesses
Harry King
Edward R. Whitman

Inventor
John C. Fyfe
By Julian C. Dowell & Son
His Attorneys

UNITED STATES PATENT OFFICE.

JOHN C. FYFE, OF BURLINGTON, WISCONSIN.

TILTING-TOP TRIPOD.

No. 931,692.     Specification of Letters Patent.     Patented Aug. 17, 1909.

Application filed May 23, 1908. Serial No. 434,624.

*To all whom it may concern:*

Be it known that I, JOHN C. FYFE, a citizen of the United States, residing at Burlington, in the county of Racine and State of Wisconsin, have invented certain new and useful Improvements in Tilting-Top Tripods; and I do hereby declare the following to be a full, clear, and exact description of the invention, such as will enable others skilled in the art to which it appertains to make and use the same.

This invention relates to tripods, and more particularly to a tripod head or top on which a camera or other instrument may be mounted and secured in different positions for taking pictures or other purposes.

The object of my invention is to provide a tilting top tripod adapted to support a camera or other instrument with provision for changing the inclination of the instrument as desired, and which shall consist of few parts arranged in compact form, adapting the top or instrument supported thereon to be easily adjusted and secured in different positions without the usual risk of tilting the instrument by accident or otherwise after being secured in a desired position, with consequent injurious effects incident to the use of cameras on tilting-top tripods as heretofore constructed.

The invention will first be hereinafter more particularly described, with reference to the accompanying drawings, which are to be taken as a part of this specification and then pointed out in the claims at the end of the description.

Figure 1:
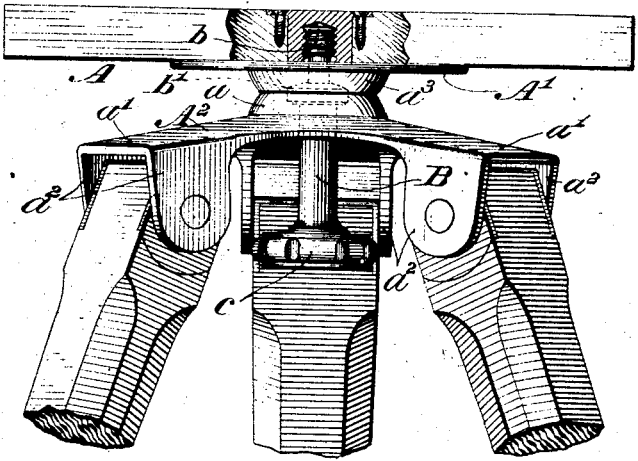
Figure 2:
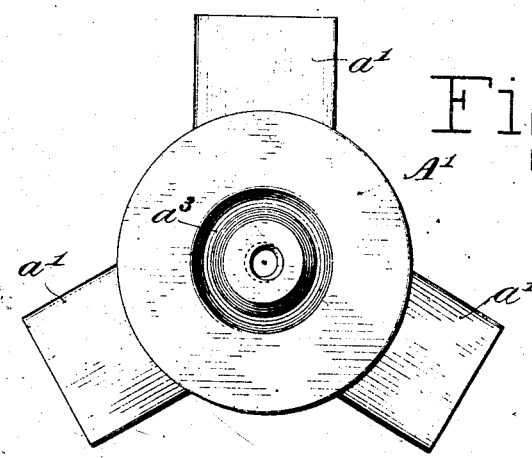
Figure 3:
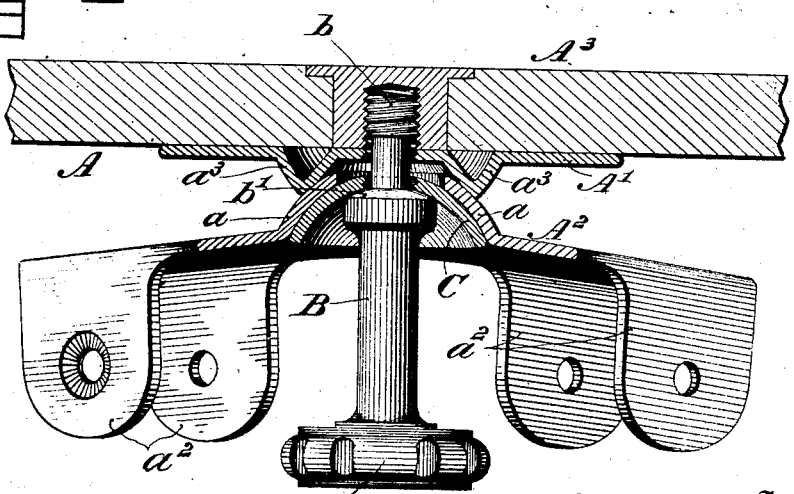

In said drawings, Figure 1 represents a side elevation of the upper portion of a tilting top tripod embodying my invention, showing a camera bottom attached thereto and partly broken away. Fig. 2 is a plan view of the tilting top, and Fig. 3 is a vertical sectional elevation of the same attached to a camera bottom partly broken away.

Referring to said drawings, in which the same reference letters are used to denote corresponding parts in different views, the letter A may denote the tilting top or head of a tripod on which may be mounted a camera or other instrument with which it is desirable to use a tripod with means for securing the instrument in a slanting position or in a horizontal position on a slanting surface. The said top or head consists essentially of two members $A^2$ and $A'$ having a ball-and-socket like or universal-joint connection through which passes a tie-bolt B for securing one member in different positions relatively to the other member, in order to vary the angle or inclination of a camera or other instrument mounted thereon as may be desired or requisite under different conditions of use. The lower stationary member $A^2$ is formed or provided with a main body portion having a centrally disposed upwardly extending concavo-convex protuberance $a$, forming one member of the ball-and-socket like or universal joint, and radial arms $a'$, which are formed or provided at the ends thereof with pendent ears or flanges $a^2$ for pivotal connection with the legs of the tripod.

The member $A^2$ may be swaged or stamped out of sheet-metal, though any suitable material may be used, but preferably it is formed in one integral structure, thus securing great strength with a minimum of material and weight and reducing the cost of manufacture by dispensing with a multiplicity of parts separably secured together.

The upper member $A'$ of the head or tilting top proper, may consist of a flat plate or annulus having an annular depression $a^3$ forming a cup or concavity underneath the plate adapted to receive the convex protuberance or cone $a$, on the lower member $A^2$, so as to form therewith a ball-and-socket like or universal joint; said cup and cone or protuberance $a$, and $a^3$, being centrally apertured to receive the tie-bolt B or fastening means by which said parts may be secured together with provision for adjusting and securing them in different positions relatively to each other. The member $A'$ may also be swaged or stamped out of sheet-metal, though any suitable material may be used, and by reason of its peculiar construction it possesses great strength with the added advantage of bringing the two members of the head close together, thus decreasing the liability of accidental displacement or tilting, which is liable to occur when the distance between the two members of the tilting top on which the camera or other instrument is mounted is considerable, it being apparent that the greater the distance between the two members or between the lower member and the camera, the greater the liability of accidental movement, which is incident to the increased leverage and effect of any force that may be exerted tending to cant the instrument.

For the purpose of securing the two members of the tilting top or head together, with provision for changing the position of the upper member and securing it in any desired position relatively to the lower member, I provide a tie-rod or bolt B having a threaded end $b$ and a shoulder $b'$ a short distance below said threaded end, such distance being equal to the thickness of the metal of the two members of the head and of an auxiliary element, as for instance a hemispherical washer C, fitting over the shoulder $b'$ so as to provide a rounded movable surface for contact with the concave surface of the protuberance on the lower member of the head, said washer presenting its convexity to the concavity of the protuberance. The shank or stem of the tie-bolt is preferably slightly enlarged below the shoulder and provided with a thumb-piece $c$, at its lower end for manipulating the same. The aperture through the concavo-convex protuberance on the lower member of the head is large enough to permit sufficient play or movement of the tie-rod or bolt to change the position of the upper member so that it may be inclined in any desired direction, but the aperture through the frusto-conical center piece of the latter member is preferably just large enough to receive the threaded end of the tie-bolt adapted to be screwed therein, in order that these parts may not become separated or the tie-bolt allowed to drop out when the camera or other instrument to which the tilting top may be secured is removed. The opening through the hemispherical washer is also preferably of such size as to adapt the threaded end of the tie-bolt to be screwed therein, to prevent separation of the washer and tie-bolt when these parts are detached or disconnected from the tilting top. As will be seen, the threaded portion of the tie-bolt extends through the tilting top a sufficient distance to adapt it to be screwed into an interiorly screw-threaded socket in the bottom $A^3$ of the camera or other instrument mounted thereon, as illustrated in the drawings.

I thus provide a simple, inexpensive, strong and durable tilting top tripod, consisting of few parts arranged in compact form with capacity for efficient service, and without liability to get out of order or permit accidental displacement or tilting of the camera in the slightest degree, which is so annoying and fraught with such disastrous results in using cameras mounted on tilting-top tripods as heretofore constructed.

Having thus described my invention, what I claim as new and desire to secure by Letters Patent of the United States is:

1. A tilting top or head for tripods, consisting of a tri-armed member having pendent ears or flanges at the ends of said arms for attaching thereto the legs of the tripod, and a centrally disposed upwardly extending cone or concavo-convex protuberance, a tilting member having a centrally disposed pendent portion forming a cup or concavity which is opposed to and fitted upon the convex portion of said protuberance, said tilting member being adapted to support an instrument having an interiorly threaded socket in its bottom, and a tie-bolt having a threaded end for engagement with said interiorly screw-threaded socket and an enlarged shank or stem below said threaded end having a rounded surface or shoulder for engagement underneath said concavo-convex protuberance, whereby the aforesaid tie-bolt both binds the two members of the head together and secures said instrument thereon close to the lower member of the head, with provision for adjustment.

2. A tilting top or head for tripods and the like, comprising two plates placed one upon the other with means for attaching the legs of the tripod, one of said plates being constructed with a concavo-convex protuberance and the other having a concavity within which said protuberance is fitted, so that the two plates are brought close together, the upper plate being adapted to support an instrument having a socket in its bottom registering with the centers of said protuberance and concavity, and a single fastening bolt having means thereon for locking engagement with said socket extending through both plates and serving as the sole means for securing them together and also securing said instrument thereon.

3. A tilting top or head for tripods, consisting of a tri-armed member having pendent ears or flanges at the ends of said arms for attaching thereto the legs of a tripod, and a centrally disposed upwardly extending cone or concavo-convex protuberance, a tilting member having a centrally disposed pendent portion forming a cup or concavity which is opposed to and fitted upon the convex portion of said protuberance, said tilting member being adapted to support a superposed instrument having an interiorly threaded socket in its bottom, and a tie-bolt serving as the sole means for uniting said members and securing said instrument thereto, said tie-bolt having a shoulder below said protuberance and a threaded end extending through said tilting member and adapted to engage said socket, a hemispherical washer being fitted over said shoulder and presenting its convex surface to the concavity of the protuberance in the lower member of the head.

4. A tilting top or head for tripods consisting of a sheet-metal plate having a concavo-convex protuberance thereon and a plurality of arms extending therefrom with provision for securing the legs of a tripod thereto, a superposed sheet-metal plate having a depressed annular portion encircling a cup or concavity formed by said depressed portion, said cup fitting over said protuberance so that the two plates are brought close together and said superposed plate adapted to support an instrument having an interiorly threaded socket in its bottom registering with the centers of both plates, and a hemispherical washer below said protuberance having its convex surface engaging the concavity of the protuberance, together with a fastening bolt having a screw threaded end protruding through said washer and sheet-metal plates for engagement with said socket, said bolt having a shoulder underneath said washer, substantially as described.

5. A tilting head for tripods and the like, comprising a plate having radial arms with means for connection with supporting legs and a central upwardly extending concavo-convex protuberance, a superposed plate having an annular depressed portion providing a concavity on the under-side of the plate adapted to fit over the convex side of said protuberance, said superposed plate being adapted to support an instrument having an interiorly threaded socket in its bottom registering with the centers of both plates, and a fastening bolt extending through both plates and having a shoulder thereon below said protuberance and a threaded end for engagement with said socket.

In testimony whereof I affix my signature in presence of two witnesses.

JOHN C. FYFE.

Witnesses:
 FLORENCE E. JOHNSON,
 GEORGE M. FYFE.